United States Patent
Torii et al.

(10) Patent No.: US 9,767,617 B2
(45) Date of Patent: Sep. 19, 2017

(54) HEAD MOUNTED DISPLAY DEVICE, CONTROL METHOD THEREOF, AND COMPUTER PROGRAM

(71) Applicant: SEIKO EPSON CORPORATION, Tokyo (JP)

(72) Inventors: Shinya Torii, Azumino (JP); Masahide Takano, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 55 days.

(21) Appl. No.: 14/808,493

(22) Filed: Jul. 24, 2015

(65) Prior Publication Data

US 2016/0049012 A1 Feb. 18, 2016

(30) Foreign Application Priority Data

Aug. 12, 2014 (JP) ................................ 2014-164246

(51) Int. Cl.

| | |
|---|---|
| G06T 19/00 | (2011.01) |
| G02B 27/01 | (2006.01) |
| G06F 3/00 | (2006.01) |
| G06F 3/01 | (2006.01) |
| G01C 21/20 | (2006.01) |

(52) U.S. Cl.
CPC .......... *G06T 19/006* (2013.01); *G01C 21/206* (2013.01); *G02B 27/017* (2013.01); *G06F 3/012* (2013.01); *G02B 2027/014* (2013.01); *G02B 2027/0138* (2013.01); *G02B 2027/0178* (2013.01); *G02B 2027/0187* (2013.01)

(58) Field of Classification Search
None
See application file for complete search history.

(56) References Cited

U.S. PATENT DOCUMENTS

| | | | |
|---|---|---|---|
| 2008/0030588 A1* | 2/2008 | Boss | H04N 5/23203 348/211.2 |
| 2010/0231735 A1* | 9/2010 | Burian | H04N 1/2112 348/220.1 |
| 2011/0221656 A1* | 9/2011 | Haddick | G02B 27/017 345/8 |
| 2014/0098132 A1* | 4/2014 | Fein | G06T 19/006 345/633 |

FOREIGN PATENT DOCUMENTS

JP 2010-139901 A 6/2010

* cited by examiner

*Primary Examiner* — Yi Wang
(74) *Attorney, Agent, or Firm* — Oliff PLC

(57) ABSTRACT

A transmission type head mounted display device includes an image display unit configured to display an image and causes a user wearing the head mounted display device to visually recognize the image, and to transmit an outside scene; a movement detection unit configured to detect that the head mounted display device moves to a specific place; and a processing control unit configured to change at least a part of predetermined functions mounted on the head mounted display device.

10 Claims, 12 Drawing Sheets

HEAD MOUNTED DISPLAY DEVICE, CONTROL METHOD THEREOF, AND COMPUTER PROGRAM

BACKGROUND

1. Technical Field

The present invention relates to a head mounted display device, control method thereof, and a computer program.

2. Related Art

In recent years, a head mounted display device that is a display device mounted on a head is known. This head mounted display device is referred to as a head mounted display (HMD) and there is a semi-transparent type display with which the user can see an outside scene in a state of HMD being mounted on his/her head. The semi-transparent type HMD causes image light generated by a light modulation element such as a liquid crystal panel to be reflected on an optical system or the like which is arranged in front of the eyes of the user, and then, displays the outside scene (real image) together with a virtual image in the region of user's field of view for example, refer to JP-A-2010-139901).

In the related art, as a semi-transparent type HMD, an HMD having a variety of functions including the function of displaying the image has been proposed. As the variety of functions, there are various functions such as a function of imaging using a camera and a function of outputting a voice. There is a problem in that those functions may be allowed to be operated at all times is not sufficiently investigated. In addition, in the head mounted display device in the related art, improvement in convenience for the user, improvement in detection accuracy, prevention of illegal use such as voyeurism, reduction in the size of the device configuration, cost reduction, energy conservation, simplification in manufacturing, and the like have been desired.

SUMMARY

An advantage of some aspects of the invention is to solve at least a part of the problems described above, and the invention can be implemented as the following forms or modification examples.

(1) An aspect of the invention is directed to a transmission type head mounted display device including: an image display unit configured to display an image and causes a user wearing the head mounted display device to visually recognize the image, and to transmit an outside scene; a movement detection unit configured to detect that the head mounted display device moves to a specific place; and a processing control unit configured to change at least a part of predetermined functions mounted on the head mounted display device when the movement to the specific place is detected. According to the head mounted display device in the above aspect, when it is detected that the head mounted display device mounted on the user moves to the specific place, at least a part of the predetermined functions mounted on the head mounted display device is changed. For this reason, at the specific place, at least a part of the predetermined functions mounted on the head mounted display device is suppressed or enhanced. Therefore, according to the head mounted display device in the aspect, the function suitable for that occasion can easily be implemented without switching the settings of the function one by one by a person.

(2) The head mounted display device may further include: an outside scene imaging unit configured to image the outside scene, in which the movement detection unit may detect the movement to the specific place based on a captured image obtained by the outside scene imaging unit. Since the outside scene imaging unit is mounted on the head mounted display device, the imaging range surely moves according to the movement of the head of the user. Therefore, according to the head mounted display device of this aspect, it is possible to detect movement to the specific place with high accuracy.

(3) In the head mounted display device, in a case where a marker for recognizing the specific place is included in the captured image, the movement detection unit may determine that the movement to the specific place is detected. According to the head mounted display device of this aspect, it is possible to detect the movement to the specific place with a high accuracy by imaging the marker.

(4) In the head mounted display device, the movement detection unit may detect the movement to the specific place based on a signal from an external wireless communication terminal. According to the head mounted display device of this aspect, it is possible to detect the movement to the specific place with a high accuracy.

(5) In the head mounted display device, the predetermined function may be an information providing function to display predetermined information on the image display unit. According to the head mounted display device of this aspect, the information providing function that causes the predetermined information to be displayed on the image display unit can be suppressed or enhanced. Therefore, it is possible to easily perform the information providing suitable for that occasion.

(6) In the head mounted display device, the specific place may be around an exhibited article or a building, and when the movement to the specific place is detected, the processing control unit may cause information on the exhibited article or the building to be displayed on the image display unit. According to the head mounted display device of this aspect, when the head mounted display device moves around an exhibited article or building, the information on the exhibited article or the building can be shown to the user by the image displaying. Therefore, it is possible to easily perform the information providing that matches the exhibited article or the building.

(7) In the head mounted display device, the predetermined function may be imaging functions including at least a marker imaging function performed for recognizing a predetermined marker, and when the movement to the specific place is detected, the processing control unit may admit the marker imaging function among the imaging functions, and may prohibit the imaging functions except for the marker imaging function among the imaging functions. According to the head mounted display device of this aspect, since the imaging functions except for the marker imaging function are prohibited only by the movement to the specific place, it is possible to surely prevent illegal use such as voyeurism.

(8) In the head mounted display device, when the movement to the specific place is detected, the processing control unit may stop the predetermined functions, and when the head mounted display device is detected to move to another place from the specific place, the processing control unit may release the stop of the predetermined functions. According to the head mounted display device in the aspect, since the predetermined functions that was once prohibited can automatically be restored, it is possible to improve the user's convenience.

(9) In the head mounted display device, when the head mounted display device is detected to exit from the specific place, the processing control unit may notify the user of the exit. According to the head mounted display device of this aspect, since the user can be notified of the fact that the head mounted display device exits from the specific place, it is possible to improve the user's convenience.

Not all of a plurality of configuration elements in each of the above-described aspect of the invention are essential. In order to solve a part or all of the problems described above, or in order to achieve a part or all of the effects described herein, a change, a deletion, a substitution with another configuration element, and a partial deletion of the limiting content can appropriately be performed regarding a part of the plurality of configuration elements. In addition, in order to solve a part or all of the problems described above, or in order to achieve a part or all of the effects described herein, by combining a part or all of the technical features included in an aspect of the invention described above with a part or all of the technical features included in another aspect of the invention described above, an independent aspect of the invention can be made.

For example, an aspect of the invention can be implemented as a device that includes at least one or all the elements among three elements of the image display unit, the movement detection unit, and the processing control unit. That is, the device may or may not include the image display unit. In addition, the device may or may not include the movement detection unit. In addition, the device may or may not include the processing control unit. The image display unit may, for example, be capable of transmitting the outside scene in addition to displaying the image and causing the user wearing the head mounted display device to visually recognize the image. The movement detection unit may, for example, detect the movement of the head mounted display device to the specific place. When the movement of the head mounted display device to the specific place is detected, the processing control unit may, for example, change at least a part of the predetermined functions mounted on the head mounted display device. This device, for example, can be implemented as the head mounted display device, but can also be implemented as another device other than the head mounted display device. According to the aspect like this, it is possible to solve at least one of the various objects such as an improvement of the use's convenience, an improvement of detection accuracy, prevention of illegal use such as voyeurism, reduction in the size of the device configuration, cost reduction, energy conservation, and simplification in manufacturing. Apart of all of the technical features in each aspect of the head mounted display device described above can be applied to this device.

The invention can be implemented in various forms other than the head mounted display device. For example, the invention can be implemented in the form of the display device, the control method for the head mounted display device and the display device, the head mounted display system, the display device, a computer program for implementing the functions of the head mounted display system and the display device, a storage medium that stores the computer program, a data signal incorporated in a carrier wave in which the computer program is included, or the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

A-1. Configuration of a Head Mounted Display

Figure 1:
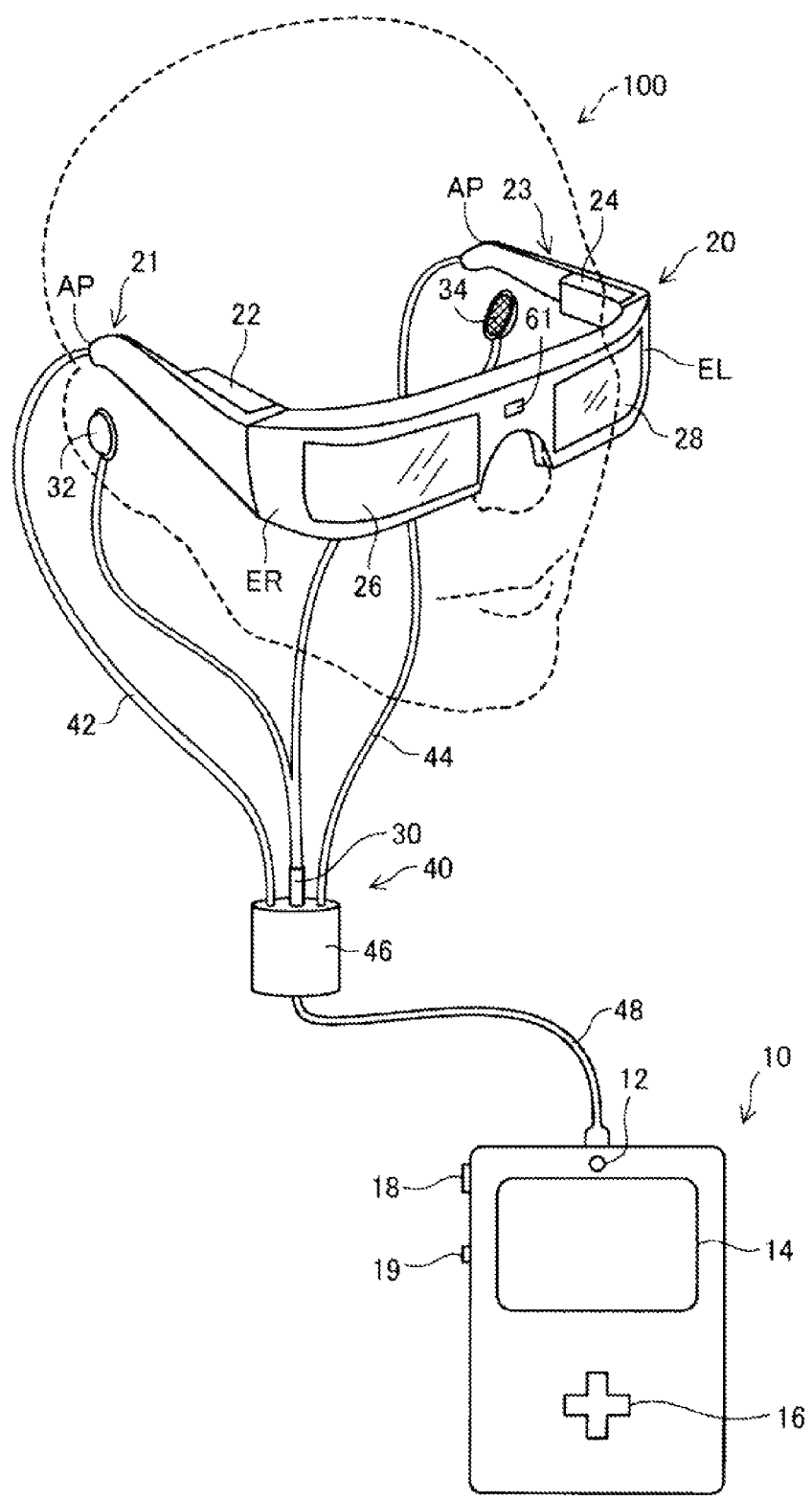
FIG. 1 is a diagram illustrating a schematic configuration of a head mounted display device (HMD) in a first embodiment of the invention.

FIG. 1 is a diagram illustrating a schematic configuration of a head mounted type display device in a first embodiment of the invention. A head mounted type display device 100 is a display device mounted on a head and is called a head mounted display (HMD). The HMD 100 is an optical transmission type head mounted display with which the user can visually recognize a virtual image and directly visually recognize an outside scene at the same time, and is used for guiding at an art museum in the present embodiment.

The HMD 100 includes an image display unit 20 that causes the user to visually recognize the virtual image in the state of being mounted on the user's head and a controller 10 that controls the image display unit 20.

The image display unit 20 is a mounting body to be mounted on the user's head and has a glasses shape in this embodiment. The image display unit 20 includes a right holding portion 21, a right display drive unit 22, a left holding portion 23, a left display drive unit 24, a right optical image display unit 26, and a left optical image display unit 28. The right optical image display unit 26 and the left optical image display unit 28 are respectively disposed so as to be positioned in front of the right and left eyes of the user when the user wears the image display unit 20. One end of the right optical image display unit 26 and one end of the left optical image display unit 28 are connected to each other at the position corresponding to the position between the eyebrows of the user when the user wears the image display unit 20.

The right holding portion 21 is a member provided to extend from an end portion ER which is the other end of the right optical image display unit 26 to a position corresponding to a side head of the user at the time when the user wears the image display unit 20. Similarly, the left holding portion 23 is a member provided to extend from an end portion EL which is the other end of the left optical image display unit 28 to a position corresponding to a side head of the user at the time when the user wears the image display unit 20. The right holding portion 21 and the left holding portion 23 hold the image display unit 20 on the head of the user in the form of temples of the glasses.

The right display drive unit 22 is disposed inside of the right holding portion 21, in other words, on the side facing the user's head at the time when the user wears the image display unit 20. In addition, the left display drive unit 24 is disposed inside of the left holding portion 23. Hereinafter, the right holding portion 21 and the left holding portion 23 will be described as a "holding portion" without distinguishing from each other. Similarly, the right display drive unit 22 and the left display drive unit 24 will be described as a "display drive unit" and the right optical image display unit 26 and the left optical image display unit 28 will be described as an "optical image display unit" without distinguishing from each other, respectively.

The display drive unit includes liquid crystal displays 241 and 242 (hereinafter, referred to as "LCDs"), and projection optical systems 251 and 252, or the like (refer to FIG. 2) Detailed configurations of the display drive unit will be described below. The optical image display unit has optical members including light guide plates 261 and 262 (refer to FIG. 2) and a dimming plate. The light guide plates 261 and 262 are formed of an optically transmissive resin material or the like, and guide the image light output from the display drive unit to the eyes of the user. The dimming plate is a thin plate-shaped optical element and is disposed so as to cover the surface side of the image display unit 20 (a side opposite to the user's eyes). The dimming plate protects the light guide plates 261 and 262 and suppresses damage to the light guide plates 261 and 262 or the adhesion of dirt, or the like. In addition, by adjusting the light transmittance of the dimming plate, the amount of external light that enters the user's eyes can be adjusted and then, the ease of the visual recognition of the virtual image can be adjusted. The dimming plate can be omitted.

The image display unit 20 further includes a connection portion 40 that connects the image display unit 20 to the controller 10. The connection portion 40 includes a main body cord 48 connected to the controller 10, a right cord 42 and a left cord 44 which are branched in two ways from the main body cord 48, and a connection member 46 provided on the branch point. In the connection member 46, a jack for connecting an earphone plug 30 is provided. A right earphone 32 and a left earphone 34 extend from the earphone plug 30.

The image display unit 20 and the controller 10 perform the transmission of various signals via the connection portion 40. To each of the end portions on the opposite side of the connection member 46 in the main body cord 48 and the controller 10, connectors (not illustrated) fitted to each other are provided. The controller 10 and the image display unit 20 are connected to or separated from each other by fitting or releasing the connector of the main body cord 48 to/from the connector of the controller 10. For example, as the right cord 42, the left cord 44, and the main body cord 48, a metal cable or an optical fiber can be adopted.

The controller 10 is a device for controlling the HMD 100. The controller 10 includes a lighting unit 12, a touch pad 14, a cross key 16, and a power switch 18. The lighting unit 12 notifies of the operation state (for example, power ON/OFF state, or the like) of the HMD 100 according to the light emitting state thereof. For example, a light emitting diode (LED) can be used as the lighting unit 12. The touch pad 14 detects a touching operation on the operation surface of the touch pad 14, and outputs a signal that corresponds to the detected content. Various types of touch pad such as an electrostatic type, a pressure sensing type, or an optical type can be adopted as the touch pad 14. The cross key 16 detects the pressing operation on the key corresponding to the up, down, right, and left direction, and outputs a signal that corresponds to the detected content. The power switch 18 switches the power state of the HMD 100 by detecting a sliding operation of the switch.

Figure 2:
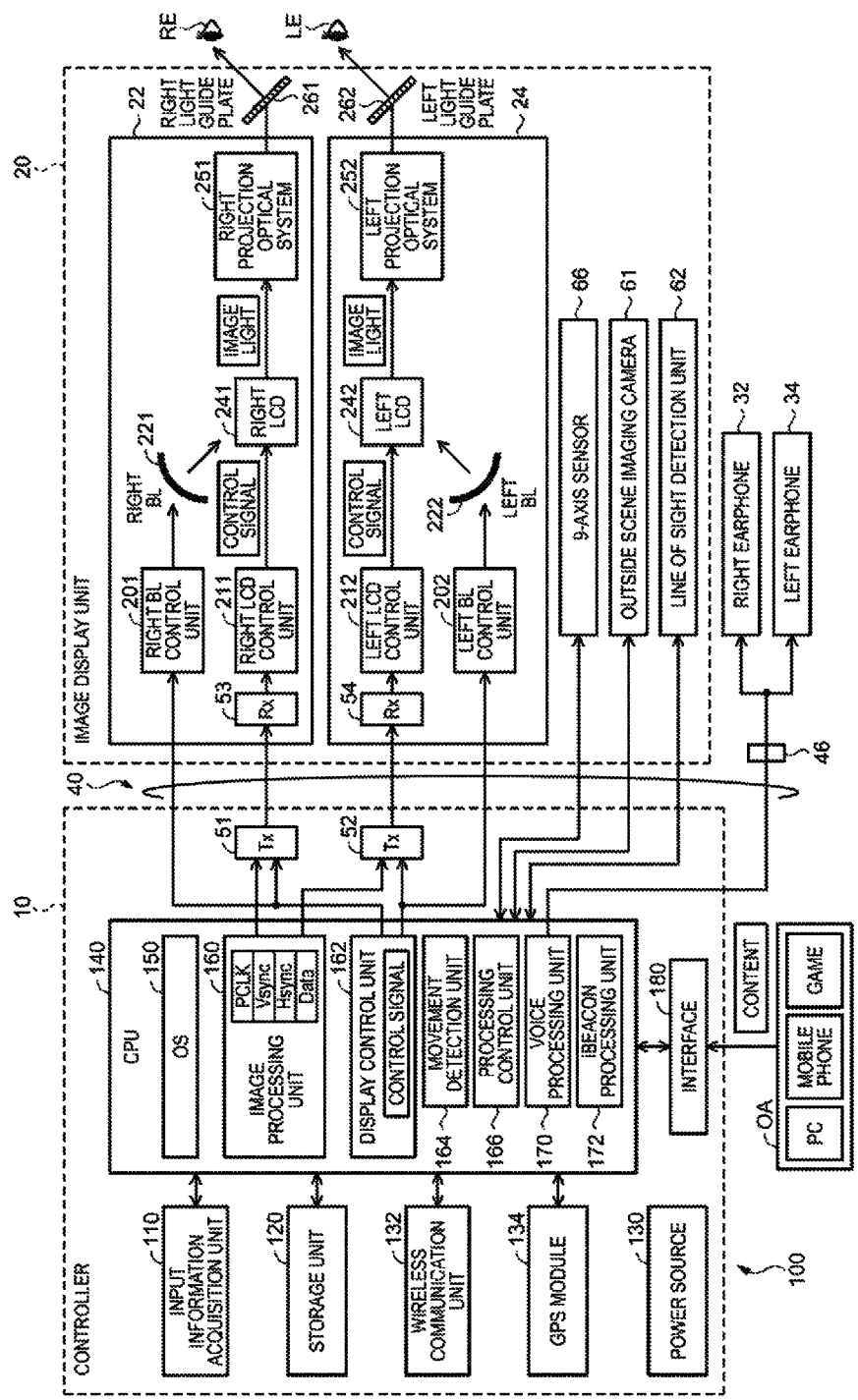
FIG. 2 is a block diagram functionally illustrating a configuration of the HMD.

FIG. 2 is a block diagram functionally illustrating a configuration of the HMD 100. The controller 10 includes an input information acquisition unit 110, a storage unit 120, a power source 130, a wireless communication unit 132, a GPS module 134, a CPU 140, an interface 180, transmission units (Tx) 51 and 52, and each of the units are connected to each other by a (not illustrated) bus.

The input information acquisition unit 110 acquires a signal according to an input operation to the touch pad 14, the cross key 16, and the power switch 18. The storage unit 120 is configured to include a ROM, a RAM, a DRAM, and a hard disk.

The power source 130 supplies the power to each unit of the HMD 100. For example, a secondary battery such as a lithium polymer battery, and a lithium ion battery can be used as the power source 130. Furthermore, a primary battery or a fuel cell may be used instead of the secondary battery, or a wireless power feeding may be received to operate. Furthermore, the power may be supplied from a solar cell and a capacitor. The wireless communication unit 132 performs wireless communication with other devices in accordance with a predetermined wireless communication method such as a wireless LAN, the Bluetooth®, or the iBeacon®. The GPS module 134 detects the current position of itself by receiving a signal from a GPS satellite.

The CPU 140 functions as an operating system (OS) 150, an image processing unit 160, a display control unit 162, a movement detection unit 164, a processing control unit 166, a voice processing unit 170, and an iBeacon processing unit 172 by reading and executing the computer program stored in the storage unit 120.

The image processing unit 160 generates a signal based on a content (image) input via the interface 180 and the wireless communication unit 132. Then, the image processing unit 160 controls the image display unit 20 by supplying the generated signal to the image display unit 20 via the connection portion 40. The signal supplied to the image display unit 20 is different from each other in cases of a digital type and an analog type. In a case of the analog type, the image processing unit 160 generates a clock signal PCLK, a vertical synchronization signal Vsync, a horizontal synchronization signal Hsync, and an image data Data, for transmission. Specifically, the image processing unit 160 acquires an image signal included in the content. For example, in a case of a moving picture, the acquired image signal is an analog signal generally configured of 30 frames of images per one second. The image processing unit 160 separates synchronization signals such as the vertical synchronization signal Vsync and the horizontal synchronization signal Hsync or the like from the acquired image signal, and generates the clock signal PCLK using a PLL circuit or the like according to the cycles thereof. The image processing unit 160 converts the analog image signal from which the synchronization signal is separated to a digital image signal using an A/D conversion circuit or the like. The image processing unit 160 stores the digital image signal after conversion in a DRAM in the storage unit 120 on a frame basis as the image data Data of RGB data.

On the other hand, in a case of the digital type, the image processing unit 160 generates the clock signal PCLK and the image data Data for transmission. Specifically, in a case where the content is digital type, the generation of the vertical synchronization signal Vsync and the horizontal synchronization signal Hsync and the conversion of the analog image signal to the digital image signal are not needed for the clock signal PCLK to be output in synchronized with the image signal. The image processing unit 160 may execute image processing tasks such as various tone correction processing tasks such as resolution conversion processing and adjustment of the brightness and the saturation, and keystone correction processing with respect to the image data Data stored in the storage unit 120, if necessary.

The image processing unit 160 transmits each of the generated clock signal PCLK, the vertical synchronization signal Vsync, the horizontal synchronization signal Hsync, the image data Data stored in the DRAM in the storage unit 120 via the transmission unit 51, and the transmission unit 52. The image data Data transmitted via the transmission unit 51 is referred to as "image data for the right eye Data 1" and the image data Data transmitted via the transmission unit 52 is referred to as "image data for the left eye Data 2". The transmission unit 51 and the transmission unit 52 function as a transceiver for a serial transmission between the controller 10 and the image display unit 20.

The display control unit 162 generates a control signal that controls the right display drive unit 22 and the left display drive unit 24. Specifically, the display control unit 162 controls the generation and emission of the image light by each of the right display drive unit 22 and the left display drive unit 24 by individually controlling a drive ON/OFF of the right LCD 241 by a right LCD control unit 211, the drive ON/OFF of a right backlight 221 by a right backlight control unit 201, the drive ON/OFF of the left LCD 242 by a left LCD control unit 212, the drive ON/OFF of a left backlight 222 by a left backlight control unit 202 or the like, using the control signal. The display control unit 162 transmits each control signal for the right LCD control unit 211 and the left LCD control unit 212 via the transmission unit 51 and the transmission unit 52, respectively. Similarly, the display control unit 162 transmits each control signal for the right backlight control unit 201 and the left backlight control unit 202.

The movement detection unit 164 detects whether or not the HMD 100 mounted on the user's head moves to a plurality of predetermined specific places. The processing control unit 166 changes at least a part of predetermined functions among the various functions mounted on the HMD 100. The predetermined functions may be one function or may be a plurality of functions, and are a plurality of functions in the present embodiment. The details of the movement detection unit 164 and the processing control unit 166 will be described later.

The voice processing unit 170 acquires a voice signal included in the content, amplifies the acquired voice signal, and supplies the signal to a speaker (not illustrated) in the right earphone 32 and a speaker (not illustrated) in the left earphone 34 connected to the connection member 46. For example, in a case where Dolby® system is adopted, processing is performed on the voice signal and the different sounds of which, for example, the frequency or the like is changed are output from each of the right earphone 32 and the left earphone 34.

The iBeacon processing unit 172 obtains a distance between a Bluetooth low energy (BLE) terminal and the HMD 100 by receiving a signal from the BLE terminal provided on the outside of the HMD 100 using an iBeacon® technology.

The interface 180 is an interface for connecting various external devices OA which are the supply sources of the content to the controller 10. As the external devices OA, a personal computer (PC), a mobile phone terminal, a game terminal, or the like can be exemplified. As the interface 180, for example, a USB interface, a micro USB interface, an interface for a memory card, or the like can be used.

The image display unit 20 includes the right display drive unit 22, the left display drive unit 24, the right light guide plate 261 as the right optical image display unit 26, the left light guide plate 262 as the left optical image display unit 28, an outside scene imaging camera 61 (refer to FIG. 1), and a 9-axis sensor 66.

The outside scene imaging camera 61 is disposed at a position corresponding to a position between the user's eyebrows at the time when the user wears the image display unit 20. For this reason, the outside scene imaging camera 61 images the outside scene which is an outside scene in a direction the user is facing in the state in which the user wears the image display unit 20 on his/her head. The outside scene imaging camera 61 is a monocular camera, but may be a stereo camera.

The 9-axis sensor 66 is a motion sensor that detects an acceleration (3 axes), an angle velocity (3 axes), and a geomagnetism (3 axes). The 9-axis sensor 66 is provided in the image display unit 20, and thus, detects the movement of the user's head when the image display unit 20 is mounted on the user's head. The direction of the image display unit 20 is specified from the detected movement of the user's head.

The right display drive unit 22 includes a reception unit (Rx) 53, the right backlight (BL) control unit 201 and the right backlight (BL) 221 that function as light sources, and the right LCD control unit 211 and the right LCD 241 that function as display devices, and the right projection optical system 251. The right backlight control unit 201, the right LCD control unit 211, the right backlight 221, and the right LCD 241 are also collectively referred to as an "image light generation unit".

The reception unit 53 functions as a receiver for the serial transmission between the controller 10 and the image display unit 20. The right backlight control unit 201 drives the right backlight 221 based on the input control signal. The right backlight 221 is, for example, a light emitting device such as the LED or an electroluminescence (EL). The right LCD control unit 211 drives the right LCD 241 based on the clock signal PCLK input via the reception unit 53, the vertical synchronization signal Vsync, the horizontal synchronization signal Hsync, and image data Data 1 for the right eye. The right LCD 241 is a transmission type liquid crystal panel on which a plurality of pixels is arrayed in a matrix shape.

The right projection optical system 251 is configured to include a collimator lens that makes the image light emitted from the right LCD 241 become a light flux of parallel state. The right light guide plate 261 as the right optical image display unit 26 guides the image light emitted from the right projection optical system 251 to a right eye RE of the user while being reflected along a predetermined optical path. The optical image display unit may use any arbitrary method for forming the virtual image in front of the user's eyes, for example, a diffraction grating may be used or a semitransparent reflective film may be used. In the present Specification, "the HMD 100 emits an image light" is also referred to as "the HMD 100 displays an image".

The left display drive unit 24 has a configuration similar to that of the right display drive unit 22. That is, the left display drive unit 24 includes a reception unit (Rx) 54, the left backlight (BL) control unit 202 and the left backlight (EL) 222 that function as light sources, the left LCD control unit 212 and the left LCD 242 that function as display devices, and the left projection optical system 252.

Figure 3:
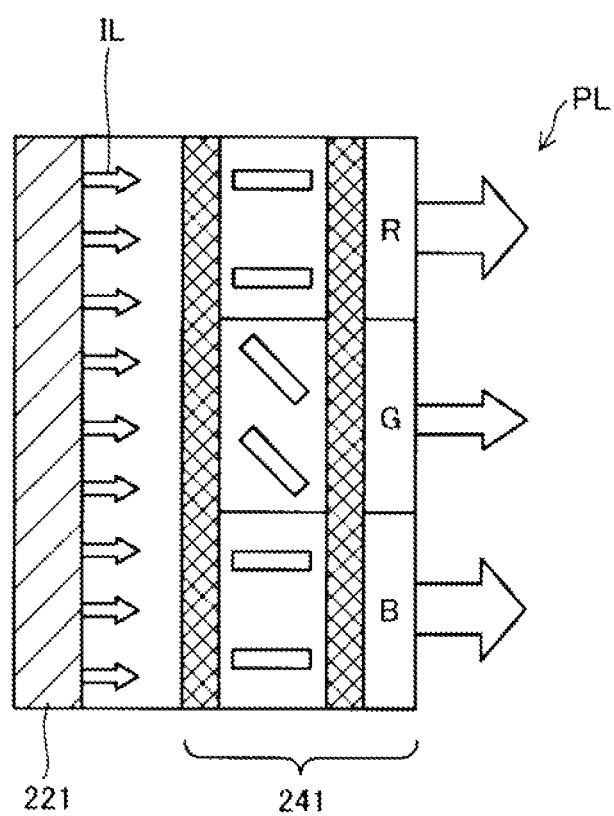
FIG. 3 is a diagram illustrating a state in which an image light is emitted by an image light generation unit.

FIG. 3 is a diagram illustrating a state in which an image light is emitted by the image light generation unit. The right LCD 241 changes the transmittance of the light transmitting the right LCD 241 by driving the liquid crystal at each pixel position arrayed in the matrix shape. As a result, an illumination light IL emitted from the right backlight 221 is modulated to an effective image light PL representing the image. The state in the left side is similar to that in the right side. As illustrated in FIG. 3, the backlight type is adopted in the present embodiment. However, the image light may be emitted using a configuration of front light type or a reflection type.

A-2. Platform of the Head Mounted Display Device

Figure 4:
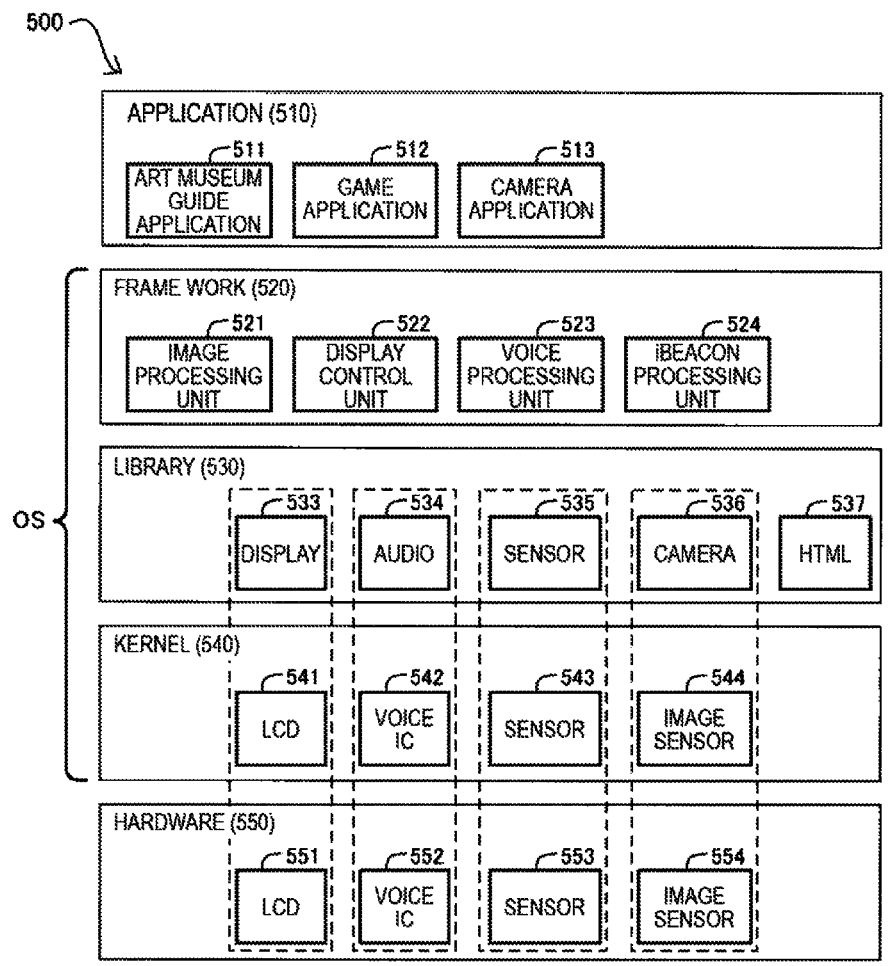
FIG. 4 is a diagram illustrating a platform of the HMD.

FIG. 4 is a diagram illustrating a platform of the END 100. The platform means a set of underlying hardware resources, OS, middleware, or the like necessary for causing the applications installed on the HMD 100 to operate. A platform 500 in the present embodiment includes an application layer 510, a frame work layer 520, a library layer 530, a kernel layer 540, and a hardware layer 550. Each layer 510 to 550 conceptually layering the hardware resources, OS, middleware, or the like included in the platform 500. The function of the OS 150 (FIG. 2) is implemented by the frame work layer 520, the library layer 530, and the kernel layer 540. In FIG. 4, configuration elements which are not necessary for the description is not illustrated.

The application layer 510 is a set of application software for executing a predetermined processing on the OS 150. Hereinafter, each application software included in the application layer 510 will be referred to as "app" or "application". In the application layer 510, both of the application installed in the HMD 100 in advance and the application which is installed in the HMD 100 by the user are included.

In the example in FIG. 4, an art museum guide application 511, a game application 512, a camera application 513, and the like are included in the application layer 510. The art museum guide application 511 provides a guidance function suitable for a museum tour. The game application 512 provides a game function. The camera application 513 provides an imaging function.

The frame work layer 520 is a set of programs in which a basic program structure and a function set are embedded that are common to the application software in the application layer 510. In the present embodiment, an image processing unit frame 521, a display control unit frame 522, a voice processing unit frame 523, an iBeacon processing unit frame 524, and the like are included in the frame work layer 520. The image processing unit frame 521 implements the function of the image processing unit 160 (FIG. 2). The display control unit frame 522 implements the function of the display control unit 162 (FIG. 2). The voice processing unit frame 523 implements the function of the voice processing unit 170 (FIG. 2). The iBeacon processing unit frame 524 implements the function of the iBeacon processing unit 172 (FIG. 2).

The library layer 530 is a set of library software made as a component such that a program for implementing a specific function can be used in other programs (for example, the applications in the application layer 510). Hereinafter, each library software included in the library layer 530 will also be referred to as "library". The library cannot be executed alone, and is executed in a manner of being called by other programs.

In the example in FIG. 4, a display library 533, an audio library 534, a sensor library 535, a camera library 536, and a hyper text markup language (HTML) library 537 are included in the library layer 530. The display library 533 drives the right LCD 241 and the left LCD 242 (FIG. 2). The audio library 534 drives a voice IC (integrated circuit) incorporated in the right earphone 32 and the left ear phone 34 (FIG. 2). The sensor library 535 drives the 9-axis sensor 66 (FIG. 2) and acquires a detection value by the 9-axis sensor 66, and processes the detection value to information to be provided to the application. The camera library 536 drives the outside scene imaging camera 61 (FIG. 2) and acquires a detection value by the outside scene imaging camera 61, and generates an outside image from the detection value. The HTML library 537 analyzes data described in a web page language and calculates the arrangement of the texts and the images for the screen displaying.

The kernel layer 540 is a set of programs in which a basic function of the OS 150 is incorporated. The kernel layer 540 manages the interaction of the software (library layer 530) and the hardware (hardware layer 550), and functions as a bridge therebetween.

In the example in FIG. 4, an LCD driver 541 for the right LCD 241 and the left LCD 242, a voice IC driver 542 for the voice IC, a sensor driver 543 for the 9-axis sensor 66, an image sensor driver 544 for the image sensor incorporated in the outside scene imaging camera 61 are included in the kernel layer 540.

The hardware layer 550 is an actual hardware resource built in the HMD 100. The hardware resource in the present embodiment means a device built in the HMD 100 by being connected to the HMD 100. That is, both the devices (for example, a sensor device of the 9-axis sensor 66, an image sensor device of the camera 61, a sensor device of the touch pad 14, and the like) internally connected to a mother board of the HMD 100 and the devices (for example, an external motion sensor device, an external USB device, and the like) externally connected to the HMD 100 via the interface 180 are included in the hardware resource.

In the example in FIG. 4, an LCD device 551 as the right LCD 241 and the left LCD 242, a voice IC device 552, a sensor device 553 of the 9-axis sensor 66, and an image sensor device 554 of the camera 61 are included in the hardware layer 550.

The libraries, drivers, and the devices which are surrounded by dashed lines in FIG. 4 are in the corresponding relationships respectively and cooperatively operates. For example, the sensor library 535, the sensor driver 543, and the sensor device 553 cooperatively operate for implementing the function of the 9-axis sensor 66. That is, it can be said that the sensor library 535 in the library layer 530 and the sensor driver 543 in the kernel layer 540 are programs (software) of which the applications use the sensor device 553 as the hardware resource (hardware layer 550). In order to be able to use the sensor device 553 as one hardware resource, a plurality of libraries may be assign to the sensor device 553.

On the other hand, in FIG. 4, the HTML library 537 in the library layer 530 has no corresponding relationships with the hardware resources and does not depend on the hardware resources. The program (software) built in the HMD 100 and does not depend on the hardware resources is referred to as "software resource" in the present embodiment. Various programs included in each layer of the frame work layer 520, the library layer 530, and the kernel layer 540 are assumed as the software resource.

A-3. Form of Using the Head Mounted Display Device

Figure 5:
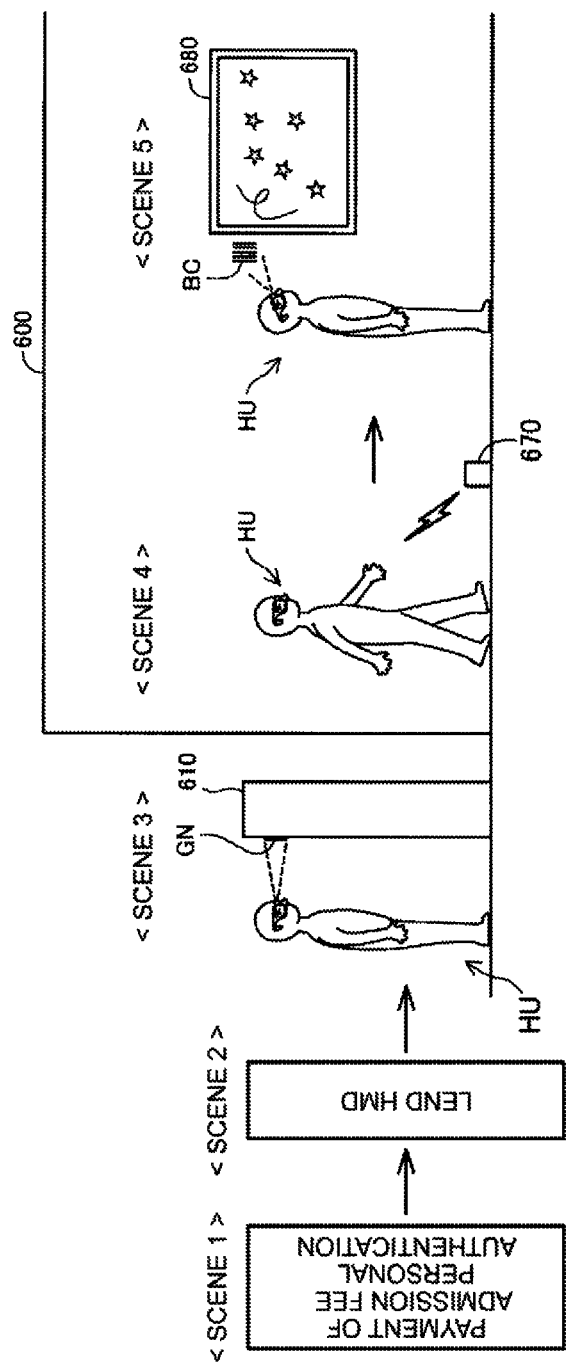
FIG. 5 is a diagram illustrating a form of using the HMD at an art museum.

FIG. 5 is an explanatory diagram illustrating a form of using the HMD 100 at an art museum. Firstly, a person visiting the art museum goes to the reception desk and pays the admission fee (scene 1). At this time, the receptionist may perform a personal authentication of the visitor. The authentication can be performed by receiving identification card such as a driving license, a passport, or a health insurance card.

In scene 2 subsequent to scene 1, the receptionist lends the above described HMD 100 to the reception-finished visitor. When, lending, the receptionist inserts an IC card, a USB memory, or a SIM card in the HMD 100 as a hard key. Instead of the hard key, a soft key such as a product key of the OS 150 may be inserted. In a case where the authentication is performed, the identification number of above-described identification card may be inserted as the soft key. The inputting of the soft key is performed using the input information acquisition unit 110 such as the touch pad 14 or the cross key 16. The hard key or the soft key input in this way is stored in the storage unit 120 of the HMD 100 as an HMD authentication key. The receptionist lends the HMD 100 in which the inputting of the hard key or the soft key is fished, to the visitor. The HMD 100 is lent in a state in which the art museum guide application 511 (FIG. 4) is started.

In scene 3 subsequent to scene 2, the visitor uses the lent HMD 100 with mounting it on his/her head. Hereinafter, the visitor using the HMD 100 is referred to as a "user". A gate (entrance) 610 is provided in front of an exhibition area 600 of the art museum, and in scene 3, a user HU proceeds to the front of the gate 610. In the gate 610, a gate identification name GN is written as a marker for identifying the gate 610. In scene 3, the user HU opens the gate 610 using the functions of the HMD 100 including the imaging of the gate identification name GN. The details of the functions will be described below.

The user HU passes the open gate 610 and enters the exhibition area 600. In the exhibition area 600, a plurality of BLE terminals 670 for the iBeacon® is installed. In scene 4 in which the user moves in the exhibition area 600, the user HU receives a presentation of the regular route (guide route) using the function of the HMD 100 including the communications with the BLE terminals 670. The details of this function will also be described below.

The user HU proceeds to the front of an exhibited article 680 and appreciates the exhibited article 680 (scene 5). A marker for identifying the exhibited article 680 is installed around the exhibited article 680 in a form of a barcode BC. At the time of this appreciation, the user receives information on the exhibited article 680 at the front of the eyes using the function of the HMD 100 including the imaging of the barcode BC. The details of this function will also be described below. The exhibited article may be an exhibited item.

The user HU who finished the appreciation of the exhibited article moves to the outside of the exhibition area 600 through a (not illustrated) gate (exit) (not illustrated scene 6), and returns the HMD 100 at the reception desk (not illustrated scene 7).

A-4. Configuration of the Gate and a Central Monitoring Device

Figure 6:
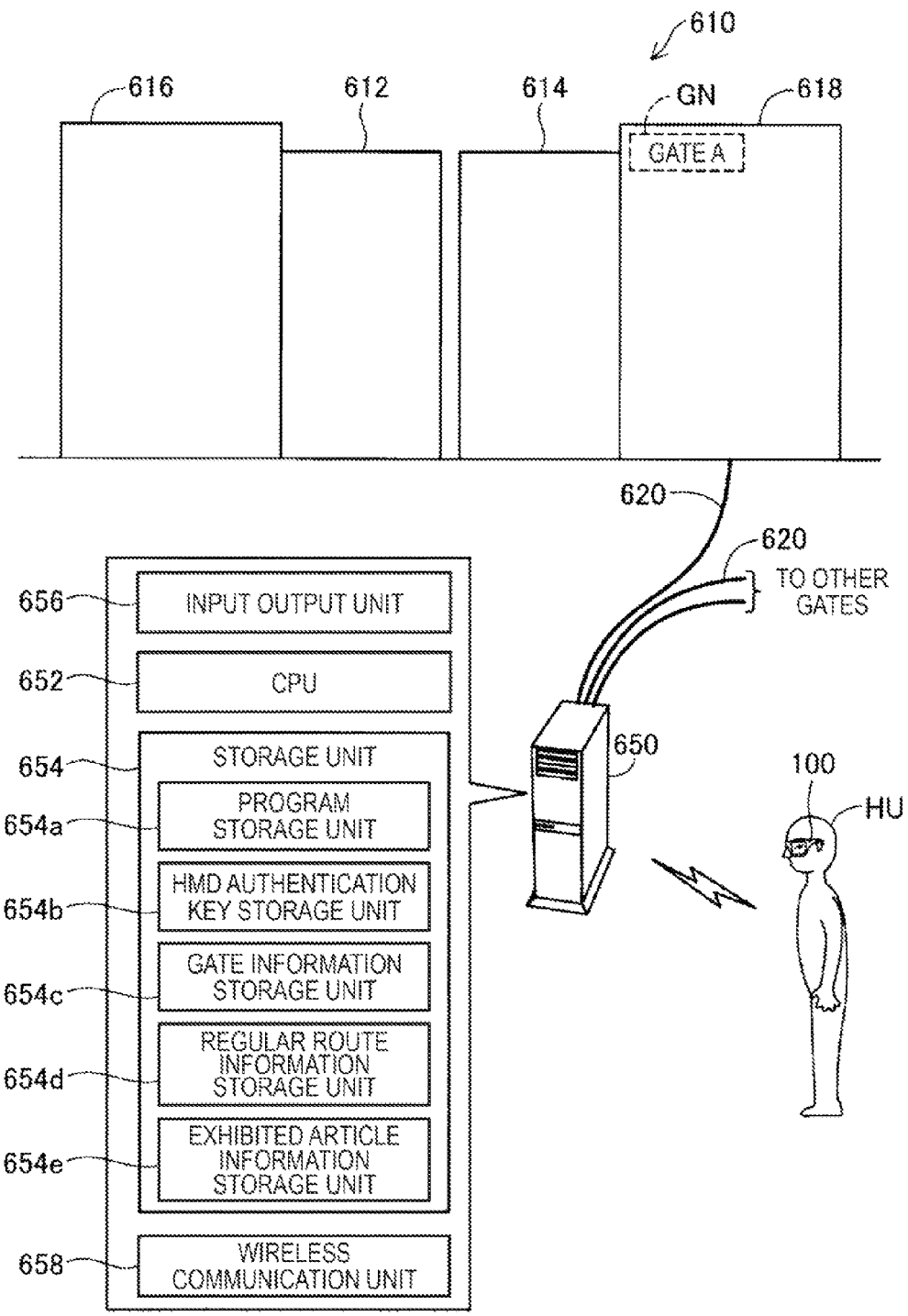
FIG. 6 is a diagram illustrating a gate and a central monitoring device.

FIG. 6 is a diagram illustrating the gate and a central monitoring device. The gate 610 is a hinged door type gate and includes a pair of slide shutters 612 and 614, a left housing 616, and a right housing 618. The slide shutters 612 and 614 are opened and closed by a shutter drive unit (not illustrated) included in the left housing 616 and a shutter drive unit (not illustrated) included in the right housing 618. In an open state, the left side slide shutters 612 is accommodated in the left housing 616 and the right side slide shutter 614 is accommodated in the right housing 618. A plurality of gates 610 is provided in the art museum, and the above-described gate identification name (for example, "gate A", "gate B" or the like) GN for identifying each gate 610 is written on the right housing 618 of each gate 610.

A central monitoring device 650 is connected to each gate 610 by cables 620. The central monitoring device 650 controls the opening and closing of each gate 610 and performs the management of the visitors. The central monitoring device 650 includes a CPU 652, a storage unit 654 configured of a ROM or a RAM, an input output unit 656, and a wireless communication unit 658.

The storage unit 654 includes a program storage unit 654a, an HMD authentication key storage unit 654b, a gate information storage unit 654c, a regular route information storage unit 654d, an exhibited article information storage unit 654e. Various computer programs are store in the program storage unit 654a in advance. The above-described art museum guide application 511 is included as the various computer programs. The HMD authentication key obtained from the HMD 100 is stored in the HMD authentication key storage unit 654b. Information regarding the gate 610 is stored in the gate information storage unit 654c in advance in correspondence with the gate identification name GN. Information indicating the regular route in the exhibition area 600 is stored in the regular route information storage unit 654d in advance. Detailed information (for example, techniques, historical background, information regarding the art history, or the like) regarding the exhibited article 680 is stored in the exhibited article information storage unit 654e in advance in correspondence with the identification code of the exhibited article 680 (FIG. 5).

The input output unit 656 transmits the opening and closing instruction from the CPU 652 to the shutter drive unit of each gate 610 via wired lines. The wireless communication unit 658 performs the wireless communications with the HMD 100 mounted on the user HU.

The CPU 652 causes the HMD 100 to implement the functions necessary in scene 3 to scene 5 in FIG. 5 while attempting to use the various information items stored in the storage unit 654 by executing the computer programs stored in the program storage unit 654a.

A-5. Processing in Scene 3

Figure 7:
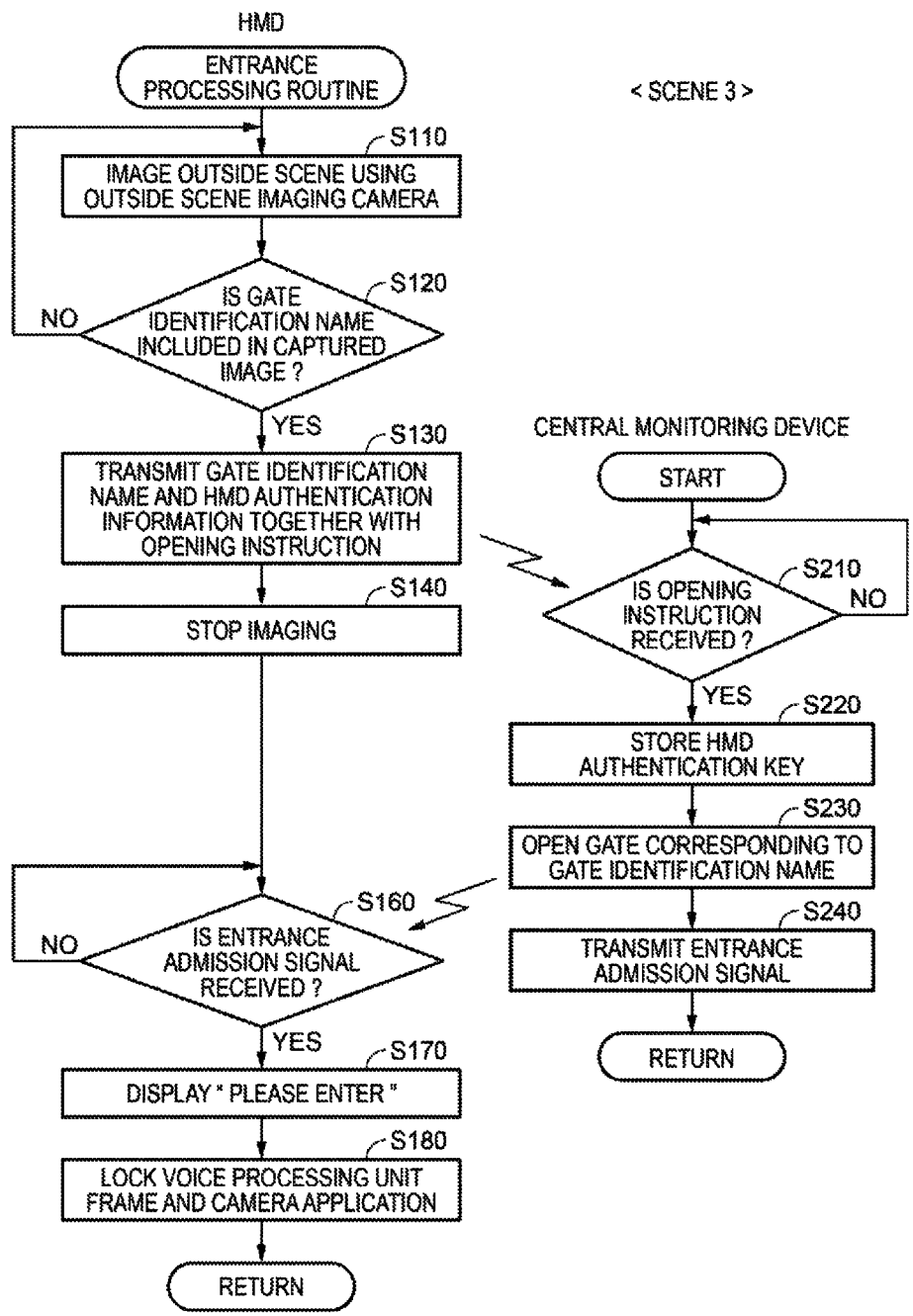
FIG. 7 is a flowchart illustrating details of an entrance processing routine.

FIG. 7 is a flowchart illustrating details of an entrance processing routine. The entrance processing routine is one of a plurality of processing routines included in the art museum guide application 511 (FIG. 4), and is repeatedly executed by the CPU 140 of the HMD 100 for each predetermined period. The entrance processing routine is executed only for the period from the lending of the HMD 100 in scene 2 to the time of passing the gate described below. When the processing starts, the CPU 140 starts the outside scene imaging camera 61 to image the outside scene (step S110). In scene 3, the user HU proceeds to the gate 610, and at that time, the outside scene is automatically imaged by the outside scene imaging camera 61.

Subsequently, the CPU 140 determines whether or not the gate identification name GN (FIG. 6) is included in the image captured in step S110 (step S120). In this determination, if a character string of the gate identification name GN is extracted from the captured image by the character pattern recognition, it is determined that the gate identification name GN is included.

In a case where it is determined that the gate identification name GN is not included in step S120, the CPU 140 returns the processing to step S110, and continues to image by the outside scene imaging camera 61 and waits for the gate identification name GN to be imaged. On the other hand, in a case where it is determined that the gate identification name GN is included in step S120, the CPU 140 transmits the gate identification name GN acquired from the captured image and the HMD authentication key stored in the storage unit 120 of the HMD 100 in scene 2 (FIG. 5) to the central monitoring device 650 via the wireless communication unit 132 together with the opening instruction to open the gate (step S130). Then, the CPU 140 stops the imaging of the outside scene imaging camera 61 (step S140). The processing executed by the CPU 140 from step S110 to the determination of YES in step 120 corresponds to the movement detection unit 164 (FIG. 2). That is, the movement detection unit 164 detects that the HMD 100 moves to the front of the gate as a specific place. In other words, the specific place is assumed to be the exhibition area 600 and the movement detection unit 164 can regard that the HMD 100 moves to the exhibition area 600 as the specific place.

The CPU 652 of the central monitoring device 650 determines whether or not the opening instruction is received from the HMD 100 (step S210). In a case where it is determined that the opening instruction is received, the CPU 652 stores the HMD authentication key which is received together with the opening instruction from the HMD 100 in the HMD authentication key storage unit 654b of the storage unit 654 (step S220). In this way, the central monitoring device 650 can register the visitor in a form of the HMD authentication key. Then, the CPU 652 performs the processing of opening the gate 610 corresponding to the gate identification name GN which is received together with the opening instruction from the HMD 100 (step S230). In the gate information storage unit 654c of the central monitoring device 650, the transmission destination of the opening signal to open each gate 610 is stored in advance as the gate information in correspondence with the gate identification name GN of each gate 610. In step S230, from the gate information storage unit 654c, the CPU 652 reads out the transmission destination corresponding to the gate identification name GN transmitted from the HMD 100, and performs the opening of the gate 610 by transmitting the opening signal to the transmission destination.

Subsequently, the CPU 652 transmits an entrance admission signal to the HMD 100 via the wireless communication unit 658 (step S240).

Next, the CPU 140 of the HMD 100 determines whether or not the entrance admission signal is received from the central monitoring device 650 (step S160). In a case where the entrance admission signal is received, the CPU 140 displays a message saying "please enter" (step S170). That is, the CPU 140 causes the above message image to be displayed on the image display unit 20.

Subsequently, the CPU 140 locks the voice processing unit frame 523 and the camera application 513 included in the application layer 510 (step S180). Since the voice processing unit frame 523 outputs all of the voices from the HMD 100, all of the voices output from the HMD 100 are erased by the voice processing unit frame 523 being locked (muted). On the other hand, the imaging function using the outside scene imaging camera 61 is included in the marker recognition processing by the art museum guide application 511 included in the application layer 510 as well as the camera application 513. According to the locking of the camera application 513 in step S180, the imaging by the camera application 513 is prohibited but the imaging according to the marker recognition processing by the art museum guide application 511 is not prohibited (that is, the imaging is admitted).

After the execution in step S180, the process exits to "return", this entrance processing routine ends once. In the present embodiment, the imaging function provided by the camera application 513 is executed using the outside scene imaging camera 61. However, instead of that, in a case of mounting another camera other than the outside scene imaging camera 61, there may also be a case where the camera application 513 performs the imaging using another camera. In this case, in step S180, the imaging by another camera may be prohibited by prohibiting the camera application 513 from imaging.

The processing tasks in steps S170 and S180 executed by the CPU 140 correspond to the processing control unit 166 (FIG. 2). That is, the processing control unit 166: i) displays the message image saying "please enter" as enhancing the information providing function, ii) locks the voice processing unit frame 523 as suppressing the voice function, and iii) admits the imaging according to the marker recognition processing as suppressing the imaging function and prohibits the imaging function of the camera application 513.

The user HU who recognizes the message image saying "please enter" according to step S170 passes the open gate 610 and enters the exhibition area 600. The locking of the voice processing unit frame 523 and the camera application 513 in step S180 continues until the user HU (that is, the HMD 100 mounted on the user HU) moves to the outside of the exhibition area 600 and the locking is firstly released in scene 6 after moving to the outside. When the HMD 100 mounted on the user HU is detected to move to the outside of the exhibition area 600 as a specific place, the fact that the locked functions are released may be notified to the user by operating the voice processing unit 170 to output the voice, or for example, displaying a message image saying "the locking is released" on the image display unit 20. According to this configuration, it is possible to improve the user's convenience.

According to the entrance processing routine configured as described above, when the user HU moves to the front of the gate 610, that is, when the HMD 100 moves to the front of the gate 610, above-described actions i) to iii) are performed. For this reason, according to the HMD 100 in the present embodiment, the information providing function of "please enter" is executed only by moving to the front of the gate 610, and furthermore, the voice function is suppressed and then, the imaging function using the camera application 513 is prohibited.

Therefore, according to the HMD 100, it is possible to improve the convenience of the user HU by the information providing. In addition, it is possible to protect the manner by suppressing the voice function from the HMD 100 in the exhibition area 600. In addition, by prohibiting the imaging by the HMD 100 in the exhibition area 600, it is possible to prevent a surreptitious imaging of the exhibited article 680 or the like. That is, according to the HMD 100, it is possible to easily achieve an effect of implementing the function suitable to the place such as in the exhibition area 600 without switching the functions one by one by a person.

According to the processing of the regular route guidance processing routine, it is detected that the HMD 100 mounted on the user moves to the front of the gate 610 by imaging the gate identification name GN attached on the gate 610. Instead however, by making the shape of each gate be different from each other in advance and imaging the gate, it may be detected that the HMD moves to the front of the specific gate from the shape of the imaged gate. In addition, the gate identification name GN may be replaced by any of a symbol, a figure, or a sign as long as those can be markers for recognizing the gate 610.

A-6. Processing in Scene 4

Figure 8:
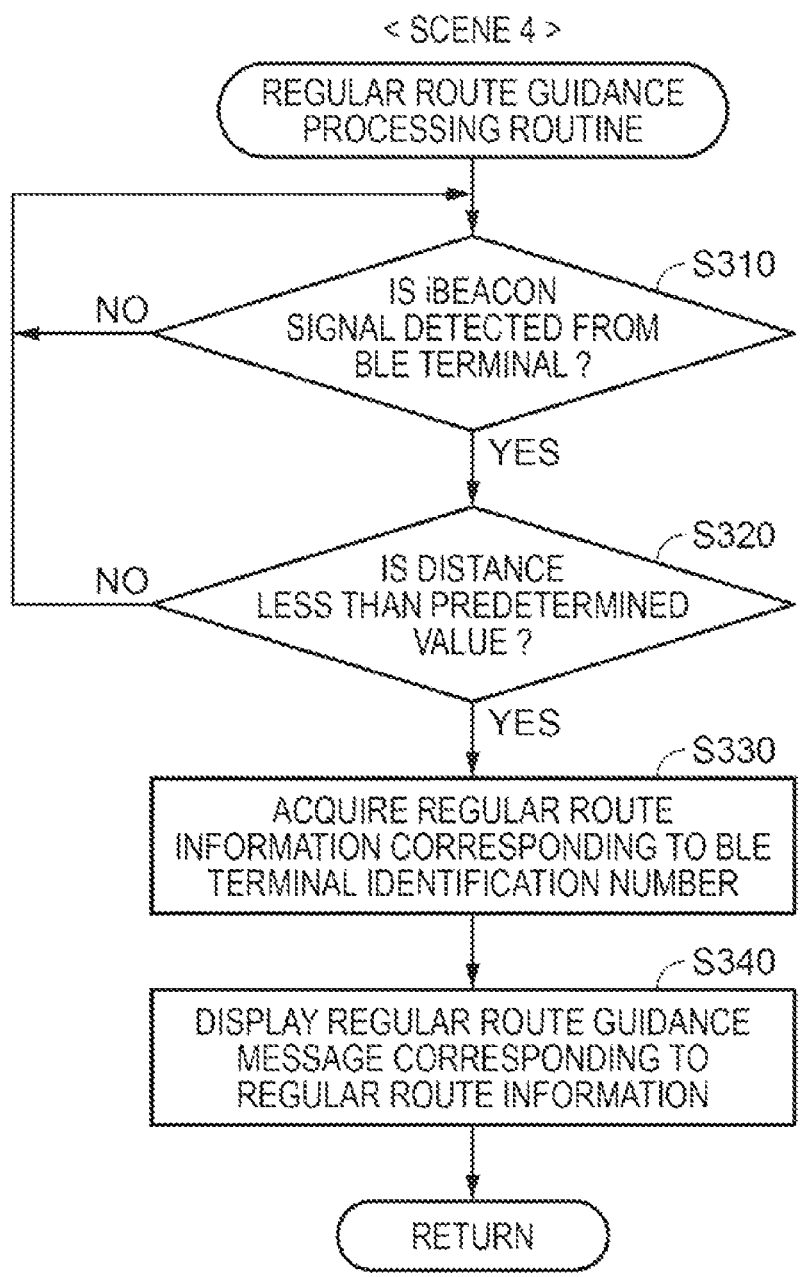
FIG. 8 is a flowchart illustrating details of a regular route guidance processing routine.

FIG. 8 is a flowchart illustrating details of a regular route guidance processing routine. The regular route guidance processing routine is one of the plurality of processing routines included in the art museum guide application 511 (FIG. 4), and is repeatedly executed by the CPU 140 of the HMD 100 for each predetermined period. In this regular route guidance processing routine, the iBeacon processing unit 172 is used. The BLE terminal 670 (FIG. 5) is respectively disposed at each turning corner or a midway part (hereinafter, referred to as "straight midway part") of a continued straight forward part on the regular route in the exhibition area 600, and the iBeacon signal is output from the BLE terminal 670. In the iBeacon signal, at least the BLE terminal identification number for identifying the BLE terminal 670 and distance to the BLE terminal 670 are held.

When the processing starts, firstly, the CPU 140 of the HMD 100 determines whether or not the iBeacon signal is detected from the BLE terminal 670 (step S310). The CPU 140 repeatedly executes the processing in step S310 until the iBeacon signal is detected. In a case where it is determined that the iBeacon signal is detected in step S310, the CPU 140 determines whether or not the distance held in the detected signal is less than a predetermined value (for example, 2 meters) (step S320). Here, in a case where it is determined that the distance is not less than the predetermined value, process returns to step S310.

On the other hand, in a case where it is determined that the distance is less than the predetermined value in step S320, processing of acquiring regular route information corresponding to the BLE terminal identification number held in the detected signal is performed. In the regular route information storage unit 654*d* of the central monitoring device 650, information such as "please turn to the left", "please turn to the right" or "please go straight forward" is stored as the regular route information according to the BLE terminal identification number. Thus, in step S320, the CPU 140 performs the above-described acquisition by reading out the regular route information corresponding to the BLE terminal identification number held in the detected signal from the regular route information storage unit 654*d*.

Then, the CPU 140 displays the regular route guidance message corresponding to the regular route information acquired in step S330 (step S340). That is, the CPU 140 causes the above regular route guidance message to be displayed on the image display unit 20.

Figure 9:
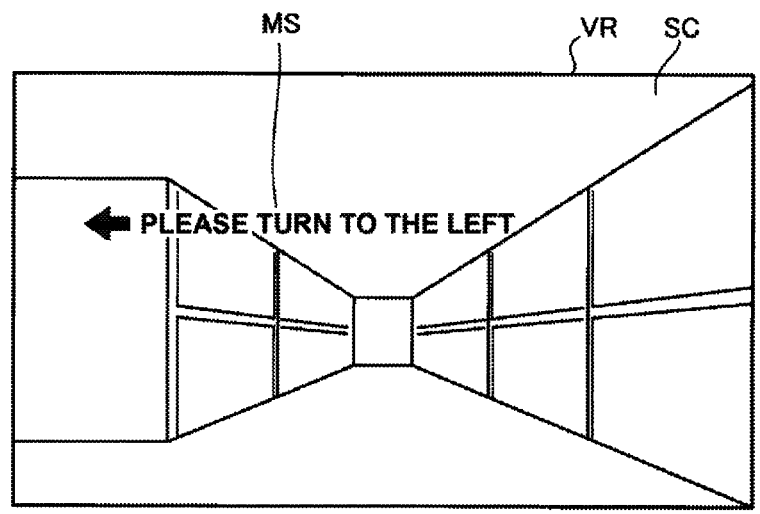
FIG. 9 is a diagram illustrating an example of a regular route guidance message which is visually recognized by a user.

FIG. 9 is an explanatory diagram illustrating an example of a regular route guidance message which is visually recognized by the user according to the result of step S340. In FIG. 9, a field of view VR of the user is illustrated. An outside scene SC in the exhibition area 600 is included in the field of view VR as illustrated. In addition, a regular route guidance message MS1 saying such as "please turn to the left" is displayed with being superimposed on the outside scene SC.

After executing step S340 in FIG. 8, the process exits to the "return", and once ends the regular route guidance processing routine. The processing tasks executed by the CPU 140 in step S310 and S320 correspond to the movement detection unit 164 (FIG. 2). That is, the movement detection unit 164 detects that the HMD 100 moves near the turning corner or near the straight midway part of the regular route as the specific place. The processing tasks executed by the CPU 140 in step S330 and S340 correspond to the processing control unit 166 (FIG. 2). That is, the processing control unit 166 displays the regular route guidance message MS1 as enhancing the information providing function.

According to the regular route guidance processing routine configured like this, when moving in the exhibition area 600, the user who wears the HMD 100 can recognize the regular route guidance message MS1 within the field of view VR. Therefore, according to the HMD 100 in the present embodiment, the user's convenience is excellent.

According to the processing of the regular route guidance processing routine, the movement of the HMD 100 mounted on the user is detected by the iBeacon technology. However, instead of that, the movement of the HMD may be detected by estimating the current position using position information which is registered when the Wi-Fi access point is installed. Alternatively, the movement of the HMD may be detected by the visible light communications using LEDs. In short, any of the wireless communication technology may be used as long as the movement of the HMD is detected based on the signal from the external wireless communication terminal. Furthermore, the movement of the HMD may be detected using the technology for obtaining the current indoor position using geomagnetism or the indoor GPS technology. In addition, if the exhibition area 600 is at the outdoor, the movement of the HMD may be detected by specifying the current position using the GPS module 134. In addition, instead of detecting the movement of the HMD using one of the above-described technologies, the movement of the HMD may be detected by combining a plurality of technologies among those technologies. Those technologies may be properly selected to be used according to the detecting position or the like.

A-7. Processing in Scene 5

Figure 10:
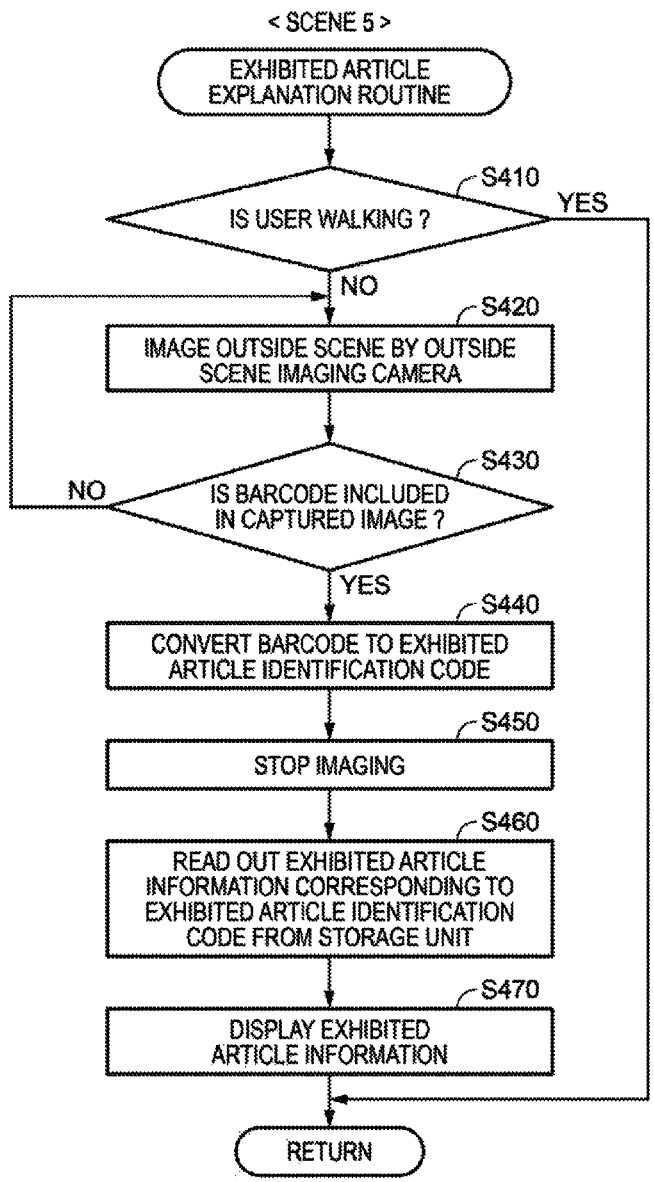
FIG. 10 is a flowchart illustrating details of an exhibited article explanation routine.

FIG. 10 is a flowchart illustrating details of an exhibited article explanation routine. The exhibited article explanation routine is one of the plurality of processing routines included in the art museum guide application 511 (FIG. 4), and is repeatedly executed by the CPU 140 of the HMD 100 for each predetermined period. When the processing starts, firstly, the CPU 140 determines whether or not the user is walking by detecting the movement of user's head in the 9-axis sensor 66 (step S410). Here, when it is determined that the user is walking, it is assumed that the user is not in a state of appreciating the exhibited article, and the process exits to "return" and the exhibited article explanation routine once ends. On the other hand, when it is determined that the user is not walking in step s410, the outside scene imaging camera 61 starts to image the outside scene (step S420). As a modification example, the imaging of the outside scene may be directly performed without the determination of walking in step S410.

Subsequently, the CPU 140 determines whether or not the barcode BC for identifying the exhibited article is included in the image captured in step S420 (step S430). In case of being not included, the CPU 140 returns the process to step S420, continues the imaging of the outside scene imaging camera 61, and waits for the barcode BC being imaged. On the other hand, in a case where it is determined that the barcode BC for identifying the exhibited article is included in the image in step S430, the CPU 140 converts the barcode BC to the identification code of the exhibited article 680 (step S440) and stops the imaging of the outside scene imaging camera 61 (step S450). Then, the CPU 140 reads out the exhibited article information corresponding to the exhibited article identification code obtained in step S440 from the exhibited article information storage unit 654e (step S460) and displays the exhibited article information (step S470). That is, the CPU 140 causes the exhibited article information to be displayed on the image display unit 20. The exhibited article information is made to be displayed on a position which is based on the position of the barcode BC included in the outside scene. In the preset embodiment, as illustrated in FIG. 5, the barcode BC is provided on the left upper side of the exhibited article 680, and thus, the exhibited article information is displayed on the position at the left direction of the barcode BC.

Figure 11:
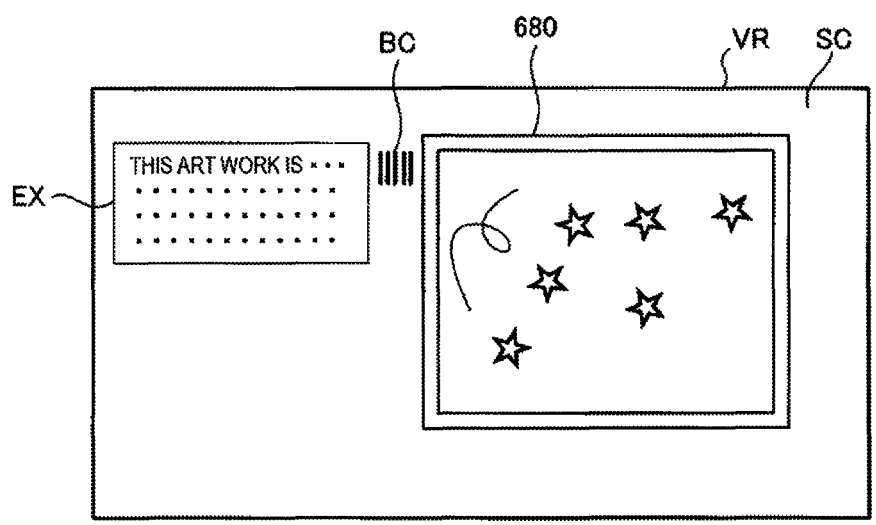
FIG. 11 is a diagram illustrating an example of exhibited article information which is recognized by the user.

FIG. 11 is a diagram illustrating an example of the exhibited article information which is recognized by the user as a result of step S470. The field of view VR of the user is illustrated. The outside scene SC around the exhibited article 680 is included in the field of view VR. In addition, exhibited article information EX is displayed with being superimposed on the outside scene SC. The exhibited article information EX is detail information about the exhibited article such as a techniques, a historical background, and the information on the history of art, and is displayed on the left side of the barcode BC in the present embodiment. The display position is not limited to the left side of the barcode BC, but may be displayed on another direction of the barcode BC. Alternatively, the position of the exhibited article may be checked by the pattern recognition and then, the exhibited article information EX may be displayed on a predetermined relative position with respect to the exhibited article.

After the execution of step S470 in FIG. 10, the process exits to "return" and once ends the regular route guidance processing routine. The processing tasks executed by the CPU 140 in steps S420 and S430 correspond to the movement detection unit 164 (FIG. 2). That is, the movement detection unit 164 detects that the HMD 100 moves to the front of the exhibited article 680 as a specific place. The processing tasks executed by the CPU 140 in steps S460 and S470 correspond to the processing control unit 166 (FIG. 2). That is, the processing control unit 166 displays the exhibited article information EX as enhancing the information providing function.

According to the exhibited article explanation routine configured as described above, the user who wears the HMD 100 can recognize the exhibited article information EX such as the techniques, the historical background, and the information on the history of art of the exhibited article 680 in the field of view VR while standing in front of the exhibited article 680. Therefore, according to the END 100 in the present embodiment, the user's convenience is excellent.

According to the processing of exhibited article explanation routine, it is detected that the HMD 100 mounted on the user moves to the front of the exhibited article by imaging the barcode BC attached around the exhibited article 680. However, the barcode BC can be replaced by other kinds of codes such as a simple and definitely black and white diagram, or a QR Code®. In addition, the position where the barcode BC is disposed may be any position as long as the position is around the exhibited article 680, instead of providing on the upper left side of the exhibited article 680. Furthermore, the barcode BC may be disposed inside of the exhibited article 680 in a form of a digital water mark. Furthermore, it may be detected that the HMD 100 moves to the front of the exhibited article based on the captured image of the exhibited article 680 itself.

B. Modification Example

The invention is not limited to the first embodiment described above and the modification examples thereof, various aspects can be embodied without departing from the spirit thereof. For example, the following modification can also be possible.

Modification Example 1

In the first embodiment and the modification examples, the place where the HMD is used is the art museum, but instead, the HMD may be used in a museum. In a case of the museum, the scenes 3 to 5 in the above-described embodiment can be directly applied. Furthermore, the HMD may be used in a theater, an opera house, a movie theater, a concert hall, or a lecture hall in addition to the art museum or the museum. In a case those facilities, for example, when entering the facilities, a voice processing unit application 514 and the camera application 513 may be locked.

Modification Example 2

Other than the places described in the first embodiment and Modification example 1, the place where the HMD is used can be various places such as a sightseeing place, a company, a department store, a factory, a school, a hospital, a guidance of the expressway, a stadium, in the train, in the car, or in the aircraft. For example, in a case of a sightseeing place, when the HMD is detected to move around the buildings (for example, a shrine and a temple, a monument, a castle, a Buddhist statue, or a tower) by the GPS, detailed information in form of above-described scene 5, that is, a history guidance of the buildings, a picture scroll of the age, or the like may be displayed. For example, when the HMD is detected to move in the public space such as in the train, in the car, or in the aircraft, the camera application 513 may be locked to achieve the prevention of the voyeurism. For example, when the HMD is detected to move in the public space, the resolution of the camera may be limited, for example, the function of an ordinary camera having a resolution of 12 million pixels may be dropped to a function of 300 thousand pixels which is a level that the face of a person cannot be recognized. For example, when the HMD is detected to move to the company, the execution of an application program file for business may be admitted. For example, in a case of a department store, using the iBeacon technology as similar forms to the above-described scene 4, when the HMD is detected to move to the front of a predetermined sales floor, information for recommending discount sales products may be displayed. For example, in the aircraft, using a mobile phone or a wireless LAN which causes the radio wave jamming is prohibited, and thus, the Bluetooth or the iBeacon of which the influence to the electronic equipment in the aircraft is small can be used. In addition, a specific place where the movement detection unit detects movement can be expanded to a unit of a wide area such as a country. For example, when the HMD is detected to move to a specific country by the GPS or the like, the functions set corresponding to that country can be changed. For example, changing the language, changing the unit of the length or the weight, or changing the output limitation to the wireless equipment may possibly be performed.

Modification Example 3

In the embodiment described above, the voice processing unit frame 523 as the processing control unit is locked as suppressing the voice function. However, instead of that, the out level of the voice may be suppressed (that is, lowering the volume). In addition, as a configuration for suppressing the information providing function, predetermined functions may be suppressed such as decreasing the information amount of the displayed guidance information. In addition, for example, predetermined processing functions may be improved, such as improving the degree of the voice output (that is, increasing the volume) or increasing the information amount of the displayed guidance information.

Modification Example 4

In the embodiment described above, operation of the camera is switched to ON and OFF as the change of imaging function of the camera. However, instead of that, various changes may be performed such as: the change of resolution, switching ON/OFF of the infra red imaging, switching ON/OFF of a video function, switching ON/OFF of the color or monochrome, switching ON/OFF of the continuous shooting, switching ON/OFF of the split shooting, switching of the storage format (raw data), switching of storing the captured image, switching of the password given to the captured image, and switching of using various filters in imaging.

Modification Example 5

In the embodiment described above, various messages are displayed as the change of the information providing function. However, the displaying ability may be switched. For example, a binocular display using the right display drive unit 22 and the left display drive unit 24 and a monocular display using any one of the display drive units, the resolution, a 3D display and a 2D display, a color and a monochrome, a transmission rate, a display brightness, the number frames of a moving picture, and a display language may be switched. In addition, an advertisement display may be switched to ON and OFF.

Modification Example 6

In the embodiment described above, as a change of the voice function, a change of a sound frequency range, a change of a bit rate (AM broadcasting level, high sound quality), an ON/OFF change of Dolby, a change of the number and type of using sound sources (synthesizer), a change of stereo and mono, and a change of any one of right and left or the both, can be applied to various switching operations. In addition, as a change of the recording function, the ON and OFF of the microphone, the ON and OFF of the recording function itself, the holding function of the recorded voice, and the password giving function, may be changed.

Modification Example 7

As a change of other functions, various sensors may be switched to ON and OFF. In addition, as a change of the function, the communication function may be changed. As the change of the communication function, the ON and OFF of the communication function, a communication speed, a communication distance, a range of a network to be connected, and an automatic connection function may be switched. In addition, ON and OFF of the Bluetooth or the iBeacon, a multi link function of the Bluetooth, ON and OFF of the RF tag reading function, a memory access range, an access function of the external memory, a library and driver access range may be switched.

Modification Example 8

In the embodiment described above, as a method of changing the functions, the elements included in the application layer 510 (for example, the camera application 513) are changed or the elements included in the frame work layer 520 (for example, the voice processing unit frame 523) are changed. However, instead of that, the elements included in the library layer 530 may be changed, the elements included in the kernel layer 540 may be changed, or the elements included in the hardware layer 550 may be changed.

OTHER MODIFICATION EXAMPLES

In the embodiment described above, the configuration of the head mounted display is exemplified. However, the configuration of the head mounted display can arbitrarily be set within the scope of the invention, for example, an addition, an elimination, or an exchange can be performed on each of the configuration units.

An allocation of the configuration elements to the control unit and the image display unit in the embodiment described above is just an example, and various aspects may be adopted. For example, the following aspects may be adopted. (i) An aspect in which the processing function such as the CPU or the memory is mounted on the control unit and only the display function is mounted on the image display unit, (ii) an aspect in which the processing function such as the CPU or the memory is mounted on both of the control unit and the image display unit, (iii) an aspect in which the control unit and the image display unit are integrated (for example, an aspect in which the control unit is included in the image display unit and the integrated unit functions as a glass type wearable computer), (iv) an aspect in which a smart phone or a portable game machine is used instead of the control unit, and (v) an aspect in which the connection unit (code) is eliminated by making the wireless communication and the wireless power supply be possible between the control unit and the image display unit.

In the embodiment described above, for the convenience of explaining, the control unit includes the transmission unit and the image display unit includes reception unit. However, both of the transmission unit and the reception unit include functions of bi-directional communications, and thus, can function as the transmission and reception unit. In addition, for example, the control unit illustrated in FIG. 2 is connected to the image display unit via a wired signal transmission path. However, the control unit and the image display unit may be connected to each other via a wireless signal transmission path such as the wireless LAN, infrared communication, or the Bluetooth®.

For example, the configuration of the control unit and the image display unit illustrated in the above-described embodiment can arbitrarily be changed. Specifically, for example, the touch pad can be omitted from the control unit and only the cross key may be used in operation. In addition, another operation interface such as an operation stick may be included in the control unit. By a configuration in which devices such as a keyboard or a mouse can be connected to the control unit, the input may be received from the keyboard or the mouse. In addition, for example, other than the input operation by the touch pad or the cross key, the operation input by a foot switch (a switch operated by a user's foot) may be acquired. For example, a line of sight may be detected by providing a line of sight detection unit such as an infrared sensor on the image display unit, and then, the operation input by a command associated with the movement of the line of sight may be acquired. For example, a gesture of the user may be detected using the camera, and then, the operation input by a command associated with the gesture may be acquired. At the time of detecting the gesture, finger tips of the user, a finger ring on the user's finger, or a medical equipment in the user's hand can be a landmark for detecting the movement. If the operation input by the foot switch or the line of sight can be acquired, even in a case of a work in which the user cannot release the hand, the input information acquisition unit can acquire the operation input from the user.

Figure 12A:
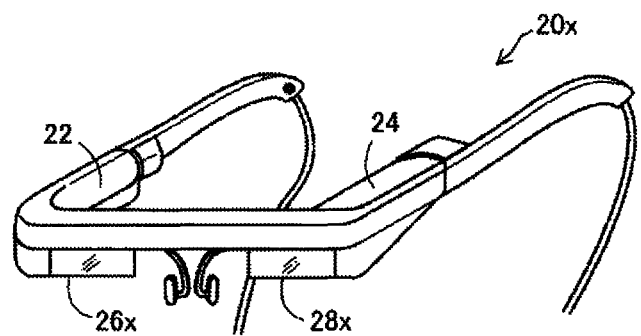
FIGS. 12A and 12B are diagrams illustrating external configurations of an HMD in modification examples.
Figure 12B:
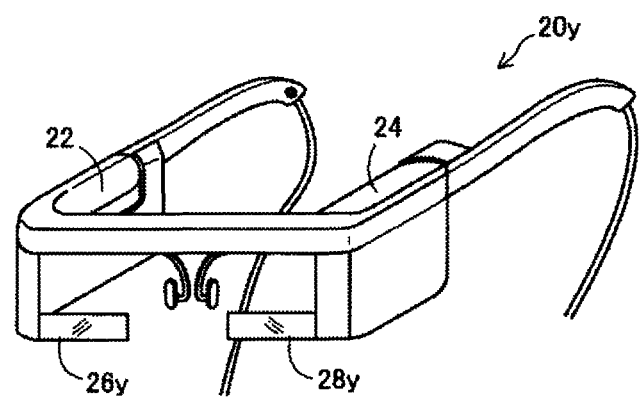

FIGS. 12A and 12B are diagrams illustrating external configurations of HMDs in the modification examples. In a case of an example in FIG. 12A, an image display unit 20x includes a right optical image display unit 26x instead of the right optical image display unit 26 and includes a left optical image display unit 28x instead of the left optical image display unit 28. The right optical image display unit 26x and the left optical image display unit 28x are formed to be smaller than the optical members in the above-described embodiment, and disposed obliquely upward on the right and left eyes of the user wearing the HMD respectively. In a case of an example in FIG. 12B, an image display unit 20y includes a right optical image display unit 26y instead of the right optical image display unit 26 and includes a left optical image display unit 28y instead of the left optical image display unit 28. The right optical image display unit 26y and the left optical image display unit 28y are formed to be smaller than the optical members in the above-described embodiment, and disposed respectively obliquely downward on the right and left eyes of the user wearing the HMD. AS described above, it is sufficient that the optical image display unit is disposed in the vicinity of the user's eyes. In addition, the size of the optical member formed in the optical image display unit is also arbitrary, and thus, the HMD can be implemented as an aspect in which the optical image display unit covers only a part of the user's eyes, in other words, the optical image display unit does not cover the user's eyes entirely.

For example, the head mounted display in the embodiment is a binocular and transmission type head mounted display, but may be a monocular head mounted display. In addition, the head mounted display may be configured to be a non-transmission type head mounted display in which the transmission of the outside scene is blocked in a state that the user wears the head mounted display.

For example, in the embodiment, the function units of the image processing unit, the display control unit, and the voice processing unit are implemented by the CPU loading the computer program stored in the ROM or the hard disk on the RAM and executing the program. However, the function units may be configured using an application specific integrated circuit (ASIC) which is designed for implementing those functions.

For example, in the above-described embodiment, the image display unit is mounted as glasses on the head mounted display. However, the image display unit may be an ordinary plan type display device (a liquid crystal display device, a plasma display device, or an organic EL display device). In this case also, the connection between the control unit and the image display unit may be the connection using the wired signal transmission path or may be the connection using the wireless signal transmission path. In this case, the control unit can also be used as a remote control device of the ordinary plan type display device.

In addition, as the image display unit, an image display unit having another shape may be adopted so as to be mounted as a cap instead of the image display unit mounted as the glasses. In addition, an ear-hook type earphone or a headband type earphone may be adopted, or the earphone may be omitted. In addition, for example, the head mounted display may be configured as a head-up display (HUD) to be mounted on a vehicle such as an automobile or an airplane. In addition, for example, the head mounted display may be configured so as to be built in a body protector such as a helmet.

For example, in the embodiment described above, the display drive unit is configured using the backlight, the backlight control unit, the LCDs, the LCD control unit, and the projection optical system. However, above aspect is just an example. The display drive unit may include a configuration unit for implementing another type together with the above-described configuration or instead of the above-described configuration. For example, the display drive unit may be configured to include a display by the organic electro luminescence (organic EL), an organic EL control unit, and the projection optical system. For example, a digital micro mirror device (DMD) can be used in the display drive unit instead of the LCD. For example, the display drive unit may be configured to include a signal light modulation unit including a color light source for generating each color light of RGB and a relay lens, a scanning optical system including a MEMS lens, and a drive control circuit for driving the above. As described above, even using the organic EL, the DMD, or the MEMS mirror, since the "emission region of the display drive unit" is still same as the region in which the image light is actually emitted from the display drive unit, it is possible to obtain the same effect as in the above-described embodiment by controlling the emission region of each device (display drive unit) same as in the above-described embodiment. In addition, for example, the display drive unit may be configured to include one or more lasers that emit laser having a strength corresponding to the pixel signal to a retina of the user. In this case, the "emission region of the display drive unit" represents the region in which the laser light representing the image is actually emitted from the display drive unit. By controlling the emission region of the laser light in the laser (display drive unit) as that in the above-described embodiment, it is possible to obtain the same effect as in the above-described embodiment.

The invention is not limited to the embodiments, the examples and the modification examples described above and can be implemented by various modifications without departing from the spirit of the invention. For example, the technical features in the embodiments, the examples and the modification examples corresponding to the technical features in each aspect described in the SUMMARY can appropriately be replaced or combined in order to solve a part or all of the problems described above, or in order to achieve a part or all of the effects described above. In addition, if the technical features are not described as essential herein, the technical features may appropriately be deleted.

The entire disclosure of Japanese Patent Application No. 2014-164246, filed Aug. 12, 2014 is expressly incorporated by reference herein.

What is claimed is:

1. A transmission type head mounted display device comprising:

an image display configured to:
- display an image;
- cause a user wearing the head mounted display device to visually recognize the image; and
- transmit an outside scene;

an outside scene imager configured to image the outside scene;

a movement detector configured to detect that the head mounted display device moves to a specific place based on a captured image obtained by the outside scene imager; and a processing controller configured to, when movement to the specific place is detected: maintain operation of a marker imaging function of the head mounted display device that is an image capturing function performed for recognizing a predetermined marker in the outside scene, and disable all imaging functions of the head mounted display device except for the marker imaging function.

2. The head mounted display device according to claim 1, wherein, in a case where a marker for recognizing the specific place is included in the captured image, the movement detector determines that movement to the specific place is detected.

3. The head mounted display device according to claim 1, wherein the movement detector detects movement to the specific place based on a signal from an external wireless communication terminal.

4. The head mounted display device according to claim 1, wherein the head mounted display has an information providing function to display predetermined information on the image display.

5. The head mounted display device according to claim 4, wherein the specific place is around an exhibited article or a building, and
when the movement to the specific place is detected, the processing controller causes information on the exhibited article or the building to be displayed on the image display.

6. The head mounted display device according to claim 1, wherein, when the head mounted display device is detected to move to another place from the specific place, the processing controller releases the disabling of the imaging functions.

7. The head mounted display device according to claim 1, wherein, when the head mounted display device is detected to exit from the specific place, the processing controller notifies the user of the exit.

8. The head mounted display device according to claim 1, wherein one function disabled by the processing controller is a photography function.

9. A control method of a head mounted display device that includes an image display configured to display an image and causes a user wearing the head mounted display device to visually recognize the image, and to transmit an outside scene, the method comprising:
- detecting that the head mounted display device moves to a specific place based on a captured image obtained by an outside scene imager; and
- when movement to the specific place is detected, maintaining operation of a marker imaging function of the head mounted display device that is an image capturing function performed for recognizing a predetermined marker in the outside scene, and disabling all imaging functions of the head mounted display device except for the marker imaging function.

10. A non-transitory storage medium containing a program for controlling a head mounted display device that includes an image display configured to display an image and causes a user wearing the head mounted display device to visually recognize the image, and to transmit an outside scene, the program causing a computer to implement functions of:
- detecting that the head mounted display device moves to a specific place based on a captured image obtained by an outside scene imager; and
- when movement to the specific place is detected, maintaining operation of a marker imaging function of the head mounted display device that is an image capturing function performed for recognizing a predetermined marker in the outside scene, and disabling all imaging functions of the head mounted display device except for the marker imaging function.

* * * * *